Feb. 3, 1959 G. PETERSON 2,872,657

APPARATUS FOR CONNECTING CIRCUIT ELEMENTS

Filed July 27, 1953 2 Sheets-Sheet 1

INVENTOR.

BY Glen Peterson

Feb. 3, 1959 G. PETERSON 2,872,657

APPARATUS FOR CONNECTING CIRCUIT ELEMENTS

Filed July 27, 1953 2 Sheets-Sheet 2

INVENTOR.

BY Glen Peterson

United States Patent Office 2,872,657

Patented Feb. 3, 1959

2,872,657

APPARATUS FOR CONNECTING CIRCUIT ELEMENTS

Glen Peterson, Tulsa, Okla.

Application July 27, 1953, Serial No. 370,544

3 Claims. (Cl. 339—193)

Figure 4B:
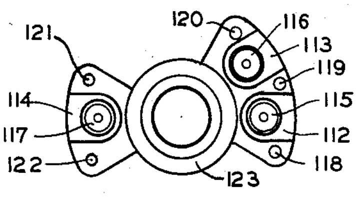

This invention relates to attachments for and improvements in electronic tube sockets and means for connecting electronic circuit elements to said tube sockets and supporting them therefrom.

The principal objective of my present invention is to provide means whereby the use of lumped circuit elements can be extended far into the U. H. F. band, and even in some instances into the S. H. F. band of the radio frequency spectrum. At the same time, it is an object of the invention to make the facilities thus provided for the higher frequency regions useful in the lower frequency portions of the radio frequency spectrum, the V. H. F., H. F., M. F. and L. F. bands, and even at audio frequencies, in conserving space and in conveniently securing lumped impedance elements directly to electronic tube sockets. A third objective is to provide a ready means of localizing or insulating ground potential reference points from the main chassis, when it is desirable to so do. A fourth object is to provide a ready and economical means of constructing stage by stage subassemblies which meet the foregoing objectives.

This application is a continuation-in-part of my copending application, Serial No. 117,056, filed September 21, 1949, now Patent No. 2,647,990.

An electronic circuit element is considered to consist primarily of the passive lumped impedance elements of resistance, capacitance and inductance; and secondarily, of such active elements as small bias batteries, crystal rectifiers, piezo-electric elements, etc. Circuit elements thus encompass many types and sizes of parts which enter into the circuit external to the electronic vacuum tube. As broadly construed, my invention provides both insulating and conducting nodular supports for electronic circuit elements. These supports, or platforms as I have chosen to call them, are made integral parts of electronic tube sockets and are caused to blend or fit into the geometry of tube, socket and circuit elements in such a way that largely the lumped impedance values of the circuit element are active in the circuit while to a great extent the unwanted accessory impedances of the circuit elements are inactive in the circuit. By accessory impedances is meant the distributed capacitance, inductance and to some extent resistance of circuit elements and associated supporting structures due to their finite lengths and surfaces.

As the frequencies of the applied radio spectrum go higher and higher the construction and inter-connection of lumped circuit elements with electronic tubes becomes increasingly difficult. The point is finally reached in the radio frequency spectrum where pure lumped impedances of a desired variety cannot be obtained and circuit elements having distributed parameters must be employed. At the same time, the physical dimensions of circuit elements having distributed parameters are often so large as to not readily meet the practical requirements of size in the upper V. H. F. and lower U. H. F. bands. Thus, there is a particular region in the now useable radio frequency spectrum between about 50 and 800 megacycles in which circuit mechanics is a limiting factor. In this region the lumped impedance elements so useful at lower frequences do not generally give optimum results, and circuit elements having distributed parameters are yet too bulky to apply.

As generally accepted, the above described radio bands in the radio frequency spectrum are defined as follows:

| | | |
|---|---|---|
| S. H. F. | megacycles | 3,000 to 30,000 |
| U. H. F. | do | 300 to 3,000 |
| V. H. F. | do | 30 to 300 |
| H. F. | do | 3 to 30 |
| M. F. | kilocycles | 300 to 3,000 |
| L. F. | do | 30 to 300 |
| V. L. F. | do | 3 to 30 |
| Audio | cycles | 30 to 30,000 |

In the application of electronic tubes to the V. H. F. and U. H. F. bands, there is an acute need for the most intimate possible relationship between certain tube elements and one or more by-pass and/or coupling condensers. At the same time, there is an equally stringent requirement for the most direct possible connection between by-pass and coupling condensers and biasing and coupling resistors. This usually requires that the connections between tube and circuit elements, have minimum inductance; and this, in turn, implies the shortest possible conductor lengths as well as minimum separation of and symmetry between conductors carrying equal and oppositely directed currents.

Again, the inductors and capacitors forming tuned circuits in the V. H. F. and U. H. F. bands must be connected to each other and to the applicable tube socket terminals with the shortest possible conductor lengths so that these inter-connecting wires have minimum resistance, capacitance and inductance. This, in turn, often requires that tube sockets be placed as close together as possible, a condition which can only be met by making proper provision for the associated circuit elements.

Another problem to be met is the shielding requirement, the difficulty of which increases with increasing frequency. It becomes especially acute when the wave length of currents flowing in shields and chassis become commensurate with the dimensions of the shields, chassis, circuit elements and conductors. These difficulties are preponderantly due to the fact that when the chassis and shields become appreciable fractions of a wave length of the currents flowing in the apparatus of which they are a part, equipotential surfaces in chassis and shields can no longer be obtained. Thus, it becomes impractical to consider chassis and shields as equipotential surfaces to which circuit elements can be "grounded" at any convenient point; rather "grounding" points must be appropriately chosen so that unwanted chassis and shield currents do no flow between circuits introducing undesirable couplings.

Usually a chassis point is chosen in the vicinity of each electronic tube and this point is considered to be the "ground" point for the circuit elements applicable to that tube. Even then, unless parts are widely spaced on a chassis, considerable trouble is had in avoiding the flow of chassis currents from circuit to circuit. Too, it is often mechanically inconvenient to tie many circuit elements to a single point on a chassis. Accordingly, and as previously stated, it is an object of this invention to provide means whereby circuit elements grouped with each electronic tube may be conveniently grounded to a highly conductive central surface whose dimensions are small compared with the wave length of the current employed, and which is insulated from the chassis and may, therefore, remain so, or may be conductively connected to the chassis as requirements dictate.

On the other hand, there are in use a wide variety of electronic tubes and, consequently, several types of tube sockets as well as a great variety of tube socket terminal connections to electronic tube elements. One tube using a particular type of socket may have the cathode connected to lug 2; another to lug 5; and still another to lug 8. Similar orientations prevail for control grids, plates, screen grids, suppressors, etc. As a matter of fact, tubes exist having a great many of all possible permutations and combinations of tube elements to base pin connections.

The foregoing limitations together with the many applications to which electronic tubes are put, make it difficult to apply a fixed scheme of interconnecting tube and circuit elements. It is, therefore, a fifth object of this invention to provide highly flexible means whereby these limitations can be economically and conveniently met in all types of applications, and whereby the changing of circuit elements in experimental work, and in repair, is greatly facilitated.

Figure 1:
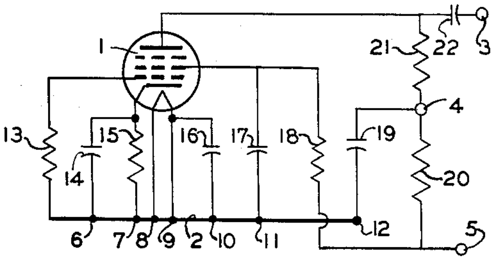

These and other objects and advantages will be understood from the following detailed descriptions taken in connection with the accompanying drawings, wherein:

Figure 1 is a schematic circuit diagram of a typical electronic tube amplifier.

Figure 2*a* is a view in elevation and partial section of one form of tube socket used in practicing my invention.

Figure 2C:
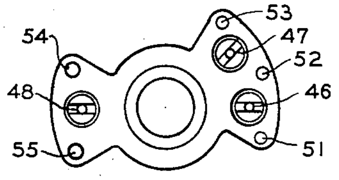
Figure 2B:
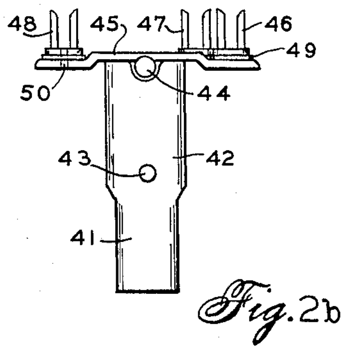

Figure 2*b* is a view in elevation of the basic form of circuit element platform.

Figure 2*c* is a plan view of the same circuit element platform as shown in Figure 2*b*.

Figure 3B:
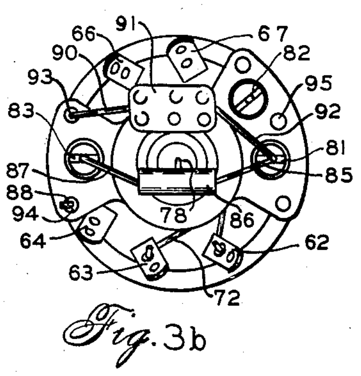
Figure 2D:
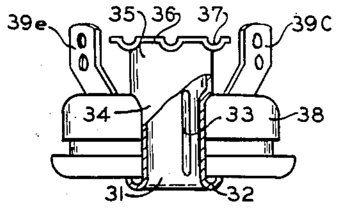
Figure 3A:
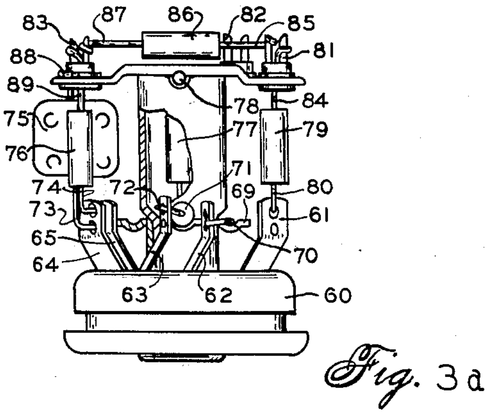

Figure 3*a* is a drawing in elevation and partial section showing the tube socket and circuit element platform combined with typical circuit elements in place.

Figure 3*b* is a plan view of the same combination of tube socket, platform, and circuit elements, as shown in Figure 3*a*.

Figure 4A:
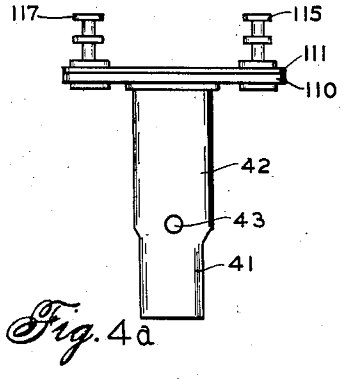

Figure 4*a* is a drawing in elevation of the same type of circuit element platform shown in Figure 2*b*, except than an improved form of table is used.

Figure 4*b* is a plan view of the circuit element platform of Figure 4*a*.

Figure 5B:
Figure 5A:
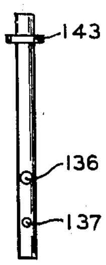

Figure 5*a* is a drawing in elevation of a simplified form of pedestal used in practicing my invention.

Figure 5*b* is a plan view of the pedestal of Figure 5*a*.

Figure 6B:
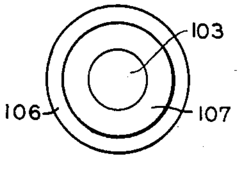
Figure 6A:
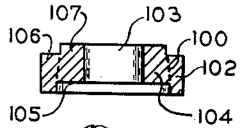

Figure 6*a* is a sectional drawing of an improved type of insulating bushing used in practicing my invention.

Figure 6*b* is a lower plan view of the insulating bushing of Figure 6*a*.

Figure 6C:
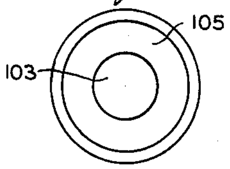

Figure 6*c* is an upper plan view of the insulating bushing of Figure 6*a*.

Figure 7B:
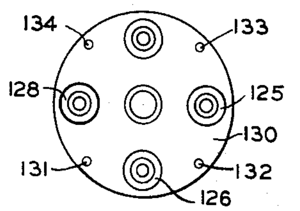
Figure 7A:
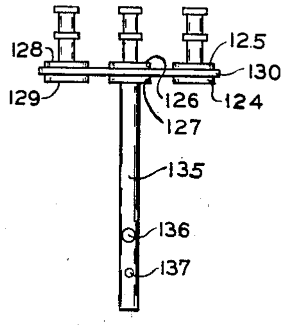

Figure 7*a* is a view in elevation of an alternative form of circuit element platform adapted primarily for use with miniature tubes.

Figure 7*b* is a plan view of the circuit element platform of Figure 7*a*.

Figure 8B:
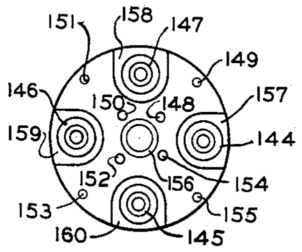
Figure 8A:
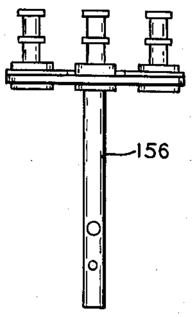

Figure 8*a* is a view in elevation of an alternative form of circuit element platform adapted primarily for use with miniature tubes and using the improved table construction of Figures 4*a* and 4*b*.

Figure 8*b* is a plan view of the circuit element platform of Figure 8*a*.

Figure 9:
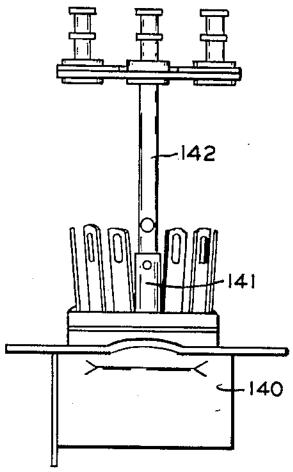

Figure 9 is a drawing in elevation showing the circuit element platform of Figure 7*a* combined with a miniature tube socket.

Figure 10B:
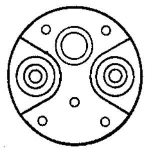
Figure 10A:
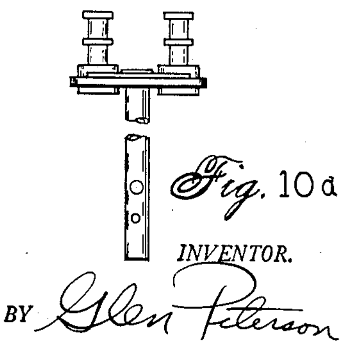

Figure 10*a* is a view in elevation of an alternative form of circuit element platform similar in principle to the platform of Figures 4*a* and 8*a*, but having a different pattern of supporting and connecting points.

Figure 10*b* is a plan view of the circuit element platform of Figure 10*a*.

Figure 11B:
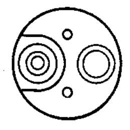
Figure 11A:
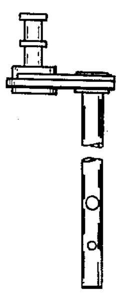

Figure 11*a* is a view in elevation of another alternative form of circuit element platform also similar in principle to the platforms of Figures 4*a* and 8*a* but again having a different pattern of supporting and connecting points.

Figure 11*b* is a plan view of the circuit element platform of Figure 11*a*.

Considering the drawings in detail, in Figure 1, I have shown an electronic amplifier circuit using a pentode 1, having a ground potential reference plane 2, insulated nodal support points 3, 4, and 5, conducting nodal support points 6, 7, 8, 9, 10, 11 and 12. Between the terminal lugs of the tube, the conducting nodes of the ground plane and the insulated nodes, the required circuit elements 13, 14, 15, 16, 17, 18, 19, 20, 21 and 22 are fastened. Circuit elements 13, 15, 18 and 20 are usually resistances; circuit elements 14, 16, 17, 19 and 22 are condensers; and 21 is any suitable form of plate load impedance involving the elements of resistance and inductance, singly or in combination, and possibly also the element of capacitance. It is seen that a total of three insulating nodes and seven conducting nodes are required. The study of a great many individual circuits or stages has shown that a large majority of them can be accommodated by three or less insulating nodes and from three to seven or more conducting nodes. This means that if a platform is provided in juxtaposition with the tube socket having three insulating nodes and about five conducting nodes, the majority of circuits, employing circuit elements supported between their terminal wires, can be accommodated. As evidenced by Figures 2*b* and 2*c*, the basic form of my circuit element platform makes use of this preferred embodiment.

That a circuit element platform might be supported from a tube socket, I have provided the tube socket, Figure 2*a*, with a central conducting stem 31. This stem has some special features which make it particularly useful. It is generally cylindrical in shape, is a good electrical conductor, and is composed of two body portions 34 and 35 having slightly different diameters. The shank 34 is pressed into the annular cavity of the tube socket so that the stem is held in place by the shoulder formed by the large diameter portion 35, on one end, and the swaged edge 32, on the other end. The stem is provided with a keyway 33 for orienting the common type of receiving tube. In the preferred form, it may also have a fluted crown 36, the purpose of which is to engage wire conductors passing directly from one or more of the tube socket terminals 39 to the ground plane. The flutes 37 are provided for receiving one end of said conductors which are soldered in place. In the crowded central region of the socket, these flutes provide the most ready and convenient means of making direct connections to the platform stem at the base of the tube socket. The connection between platform stem and chassis, if one is made, is also accomplished by means of the fluted crown. Preferably, this connection is made to that tube socket lug which is directly grounded, ordinarily a heater lug, and the grounded socket lug is, in turn, tied to the crown via a flute.

In some forms of tube sockets, the stem might conveniently be molded into the plastic insulating body of the tube socket.

The circuit element platform, shown in Figure 2*b* is composed of several pieces. It has a cylindrical pedestal of conducting material 42 having a reduced diameter portion 41 of such size that it makes a sliding fit into the portion 35 of the tube socket stem. In this way the circuit element platform may be rotated in the tube socket stem, relative to the tube socket lugs or pins, until the most suitable position is found for the particular tube and circuit being used. This is one essential feature which I have provided to give my invention general utility.

In addition to the pedestal, my circuit element platform has a table 45, likewise of conducting material and this table is securely and conductively fastened to the pedestal 42. Thus, table 45, pedestal 42, and stem 31 form a continuous conducting body from the base of the tube to the extreme terminal points of the circuit elements. It is this conducting body which acts as the ground plane for the circuit in which the tube is employed. It is so shaped and arranged with respect to the tube that most ground return currents pass along a path oppositely directed to the current flow in the adjacent circuit element. This will be better seen when particular reference is made to Figures 3*a* and 3*b*.

The platform table 45 is fitted with three insulated lugs 46, 47, 48. These are used to support circuit elements from nodal points differing from ground potential, as the points 3, 4, 5, of Figure 1. The lugs preferred for this use are of the split-ear variety and have an annular opening 50, Figure 2*b*, of dimensions sufficient for a wire terminal of a circuit element to pass. The use of such lugs makes it extremely convenient in wiring the circuit. The circuit elements can first be fastened to the tube socket lugs leaving the other terminal wire free and generally parallel to the tube socket axis of symmetry. The circuit element platform may then be fitted into place with the free circuit element terminal wires passing through the appropriate lug openings, or the openings 51, 52, 53, 54 and 55 in the platform table. These terminal wires may then be pulled tight, crimped and soldered in place.

Each platform lug is insulated from the platform table by means of two identical insulating bushings 49. These insulating bushings have extruded portions which pass part way into the circular opening in the table, one from the top side and one from the under side. The lugs are swaged in place, and in the preferred form are arranged on a radius about equal to the radius used in placing the tube socket lugs. For octal sockets, these lugs are preferably placed 135° and 45° apart, respectively, as shown by Figure 2*c*. Using such an arrangment, I have found, as previously stated, that a large majority of tubes and circuits can be accommodated.

Another feature of my circuit element platform and tube socket is that it extends the shielding, usually provided inside pentodes and other high gain amplifiers, to external portions of the circuit. The tube pins, lugs and circuit elements diametrically opposite each other are well-shielded while those parts closer together have somewhat poorer shielding. Usually, the grid and plate of a high gain tube terminate on pins that are diametrically opposite, or nearly so. But even when this is not the case, the shielding is improved by the presence of the conducting pedestal, moreover, the circuit elements can usually be mounted between platform and tube lugs in a manner that will improve the shielding.

It will also be noted that my circuit element platform, being composed largely of conducting material held at reference potential, provides a conductive guard for each insulated node or lug. Thus, currents leaking through or across the insulation flow to "ground" rather than to a neighboring node. This feature is of particular importance in humid climates and/or extremely high impedance circuits.

Figures 3*a* and 3*b* illustrate in detail the variety of ways circuit elements can be mounted and interconnected on the platform and between platform and tube socket. In this drawing, 60 is the insulating tube socket body, 61 to 68, inclusive, are the tube socket lugs, 69 is the crown of the tube socket stem, 70 is a conductor connecting lug 62 to the crown. 72 is the terminal conductor of by-pass condenser 77, placed inside the platform pedestal, which connects to socket lug 63 after passing through insulator 71. The latter fits into the hole 43 (Figure 2*b*) of the stem and is soldered to the stem if it has a fused metallic ring; if not, it may be fastened to the stem by means of a suitable adhesive; or insulator 71 may simply be a small grommet. The upper terminal 78 of the by-pass condenser is soldered or otherwise conductively fastened to the platform pedestal near the table, after passing through opening 44.

On the left-hand side of the socket and platform, as shown in Figure 3*a*, 73 is a terminal conductor of circuit element 75 which fastens to socket lug 64, while 88 the other terminal wire of 75, conductively fastens in hole 94 of the conducting table. Circuit element 76 fastens between tube socket lug 64 and platform lug 83 by means of terminal wires 74 and 89, respectively. On the right hand side of the platform and socket, circuit element 79, using terminal wires 80 and 84, is fastened between socket lug 61 and platform lug 81, respectively. Across, the top of the table, circuit element 86 is fastened between platform lugs 83 and 81 by means of terminal wires 87 and 85, respectively. Similarly, circuit element 91 is fastened between platform lug 81 and platform hole 93, using terminal wires 92 and 90, respectively.

It will be noted that the circuit elements most critical in the operation of the circuit lie inside the pedestal or adjacent to the pedestal's external surface. All of these critical elements are arranged to have current flow parallel to the axis of the pedestal. Supposing that current flows out through the circuit elements, the return current flows back along the pedestal in an opposite direction so that the space occupied by the circuit element is essentially field-free over the frequency ranges being considered. That this is so is easily seen when the remote end of the circuit element is grounded directly to the table. It is equally true when the remote end of a circuit element is by-passed to the table by means of a condenser. In this instance, the by-pass condenser lies parallel and adjacent to the table so that the space occupied by it is also essentially field-free. The return current then passes from table to pedestal to stem to tube socket lug, as before described.

In my prior Patent No. 2,647,990, above referenced, the insulating bushings, by means of which the platform lugs were insulated from the table, had simple extruded small diameter portions which passed part way into the circular openings of the table, both from the top and under sides. These bushings were in general made in two ways: by means of a molding process in which instance they were mechanically sturdy but economically expensive; and by means of a punch press in which instance they were mechanically weak but inexpensive.

The primary defect in the original punch-press bushing was that the shear line joining the small diameter extruded portion to the larger diameter portion was generally perpendicular to the two faces of the bushing. These bushings being very small (about ¼ inch in diameter and from $\frac{1}{32}$ to $\frac{1}{16}$ inch thick) the small diameter extruded portion generally separated completely from the larger diameter portion during the eyeleting process—if not before. Thus, the lugs could not be reliably retained to the platform table.

This problem was solved by inventing an insulating bushing, Figures 6*a*, 6*b* and 6*c*, having a conical surface of shear, 100, joining the large and small diameter portions, 102 and 104. These bushings can and have been inexpensively produced on a punch-press. This is done by having the opening in the die-plate slightly smaller in diameter than the punch; by heating the material to at least 200° F. so that it is somewhat plastic; and by using a three-stage die. Sheet stock is fed into the punch-press. In the first operation, the central hole, 103, is punched completely through the material; in the second operation the small diameter portion, 104, is extruded along the conical shearing surface as above described; while in the third operation, the bushing is blanked from the material. In this way, the large-diameter portion, 102, is fully supported by the sheet of material while the conically-shaped small-diameter portion, 104, is formed; otherwise, the large-diameter portion would be split from wedging action.

When this type of bushing is used very few are broken during the eyeleting operation and it is found that the assembly is extremely sturdy. With the head of the lug bearing against the surface, 105, of the small-diameter conically-shaped portion of the upper bushing, the swedged end of the lug bearing against the surface, 105, of the lower bushing, while the surfaces, 106, bear against the platform table, the extruded portions 107 passing into the hole from top and bottom, a rigid assembly of considerable mechanical strength is formed. The conically-shaped surfaces of shear clearly prevent the small and large diameter portions from separating when the force applied by the eyelet or terminal lug is in that direction which attempts to push the small diameter portion through the small opening of the large diameter portion. It is this type of bushing which is now used in forming the circuit element platform of Figures 2*b* and 2*c*.

To be further assured of providing a long lasting sturdy assembly, the insulating bushings of Figures 6*a*, and 6*b*, and 6*c* are varnished, either before or after assembly, with a good commercial insulating varnish and baked. This also serves to seal the pores of the sheared edges of the bushings and thus to maintain excellent insulation for a great many years.

Despite the excellence of the foregoing circuit element platform, it was still too costly to manufacture for a great many applications. As a result, a more economical means of providing the conducting and insulating features of the circuit element platform was sought.

The greatest single element of cost in the circuit element platform which uses two individual insulating bushings per lug is the assembly time. The lug, the two bushings and the metallic table—four elements as a minimum, must be joined to produce an insulated terminal. It was found that this operation alone cost as much as all other operations combined, plus the cost of the material.

There has been made available to the market a sandwich material consisting of a thin metallic conducting sheet bonded to a thicker insulating sheet. This material is marketed primarily for printed circuit applications, but it was to it that I turned to obtain the most economical means of manufacturing my circuit element platform, as illustrated by Figures 4*a* and 4*b*. This technique avoids the use of insulating bushings altogether.

The pedestal is made as before described while the table is punched from metal clad insulating material. In Figure 4*a*, 110 is the insulating portion of the table and is made, for example, from phenolic or other suitable plastic insulating materials, while 111 is the conducting surface of the sheet formed by depositing copper or silver, for example, on the phenolic body 110. To provide insulated islands for the terminal lugs, portions of the conducting material are removed from the insulating body leaving areas 112, 113, and 114 where lugs 115, 116, and 117 are located. In those portions of table where holes 118, 119, 120, 121 and 122 are punched, the conducting material is left intact; so also is the conducting material in the center of the table where the pedestal is attached. Thus, a circuit element platform electrically identical with the circuit element platform of Figures 2*b* and 2*c* has been created. It has, or can have, as many insulated terminal nodes as may be required for the support of circuit elements; it has, or can have, as many conducting terminal holes for the support of circuit elements as may likewise be required; it provides for an intimate conducting joint between the conducting material of the table and the conducting pedestal, and thence to the conducting tube socket stem. The only important differences are that the table, 123, of Figures 4*a* and 4*b* can be produced from prefabricated sheet stock, at the rate of hundreds per hour using a punch-press and a die of novel and ingenious construction; and the lugs can be rapidly and economically mounted to said tables by hand or by means of automatic machinery. Again, said parts can be produced by means of a die and punch-press in combination with a commercial photo-etching process, and assembled with lugs as above.

Figures 7*a* and 7*b* illustrate a form of circuit element platform particularly adapted to the use of miniature tubes, as shown by Figure 9. This circuit element platform is fabricated from the insulating bushings of Figures 6*a*, 6*b* and 6*c* as 124 through 129, Figures 7*a* and 7*b*, a continuous metal plate table 130, the latter being provided with conducting holes 131 through 134, and to which is conductively fastened the pedestal 135. The pedestal is preferably tubular and may be provided with side holes 136 and 137 of one or more sizes to which wires can be soldered, or through which wires may pass.

In Figure 9, 140 is a miniature tube socket generally provided with a stem 141 and to which circuit element platform 142 is attached.

Figures 5*a* and 5*b* show pedestal details of the assemblage of Figures 7*a* and 7*b*. It is generally produced on an automatic screw machine type of lathe in three or four operations. Metallic tubing, of chosen inside and outside diameters, is fed into the screw machine through a suitable collet, the head 143 extruded, the side holes 136 and 137 drilled, and the part then cut off. These parts can also be made at the rate of several hundred an hour.

Figures 8*a* and 8*b*; 10*a* and 10*b*; 11*a* and 11*b* illustrate other circuit element platforms, particularly adapted for miniature tubes, and having tables fabricated from the metallic clad insulating material as described in connection with Figures 4*a* and 4*b*. Figures 8*a* and 8*b* show four insulated terminals 144 through 147, and eight conducting holes 148 through 155. Of the latter, the holes 148, 150, 152 and 154 are particularly important as they are closest to the stem 156 and therefore permit the shortest possible connection of circuit elements to a common grounding surface such as that provided by pedestal 156 and associated conducting table surface. As previously described, in connection with Figures 4*a* and 4*b*, the metal surface of the table is removed in the areas 157 through 160 to provide for the insulation of the terminal lugs.

The platform of Figures 10*a* and 10*b* provides for two insulated terminals and five conducting holes, as shown; while the platform of Figures 11*a* and 11*b* provides for a single insulated terminal and two conducting holes. The pedestals of these platforms are also no longer centrally placed with respect to the tables, lugs and holes, and, when used with a tube socket having a centrally located stem, have some advantages in making tube socket lugs more accessible to a soldering iron. These variations are included to show a few of the many ways in which a circuit element platform can be adapted to meet particular circuit needs—for example, circuits having many circuit elements and circuits having but a few circuit elements.

It is clear that the truncated types of extruded bushing or washer may have applications other than in the construction of circuit element platforms. For example, these washers are generally useful wherever it is necessary or desirable to provide an insulated terminal lug which is supported by and from a conducting sheet. Using such washers, one can construct manifold circuit element terminal boards largely from metal sheets; whereas, the general practice has been to construct circuit element terminal boards from insulating sheets. Again, a circuit element terminal board apart from the main chassis is no longer required in many applications. The truncated bushing can be used to support circuit element terminal lugs directly from the chassis.

By the same token, the adaptation of metal-clad insulating materials, wherein non-comforming portions are adapted for insulating terminal lugs and conforming portions are adapted for conducting terminal holes, need not be confined to circuit element platforms specifically. Such embodiment of conducting and insulating materials has a broader application in supporting circuit elements in many different physical situations.

I claim:

1. An arrangement for mounting and interconnecting circuit elements to minimize unwanted accessory impedances comprising in combination an electronic tube socket having lugs radially disposed about a centrally-located stem, and a conducting tubular pedestal which mates electrically and mechanically with the central stem of the tube socket and which supports a conductive platform, said platform comprising a substantially flat terminating sheet carrying an insulating sheet presenting at least one exposed portion, each exposed portion supporting terminal means.

2. An arrangement for mounting and interconnecting circuit elements, as in claim 1, said platform having a generally circular shape, said terminal means comprised of a terminal lug fastened to said exposed portion.

3. An arrangement for mounting and interconnecting circuit elements, as in claim 1, said terminating sheet and said insulating sheet having at least one opening which passes through both and which is adapted to serve as additional terminal means.

References Cited in the file of this patent

UNITED STATES PATENTS

| | | |
|---|---|---|
| 1,939,130 | Mills | Dec. 12, 1933 |
| 2,066,876 | Carpenter | Jan. 5, 1937 |
| 2,405,554 | Barbour | Aug. 13, 1946 |
| 2,443,545 | Schwennesen | June 15, 1948 |
| 2,448,766 | Burke | Sept. 7, 1948 |
| 2,480,523 | Tubbs | Aug. 30, 1949 |
| 2,508,030 | Karns | May 16, 1950 |
| 2,526,834 | Traugott | Oct. 24, 1950 |
| 2,624,775 | Hughes | Jan. 6, 1953 |
| 2,637,763 | Palmer | May 5, 1953 |
| 2,647,990 | Peterson | Aug. 4, 1953 |
| 2,698,423 | Modrey | Dec. 28, 1954 |

FOREIGN PATENTS

| | | |
|---|---|---|
| 579,890 | Great Britain | Aug. 20, 1946 |